Sept. 19, 1967          H. K. NAUMANN          3,341,928
APPARATUS FOR TESTING, SORTING AND ASSEMBLING ARTICLES
Filed Aug. 3, 1965          7 Sheets-Sheet 1

INVENTOR
H.K. NAUMANN
BY D. S. Urey
ATTORNEY

United States Patent Office

3,341,928
Patented Sept. 19, 1967

3,341,928
APPARATUS FOR TESTING, SORTING AND
ASSEMBLING ARTICLES
Harry K. Naumann, Wernersville, Pa., assignor to
Western Electric Company, Incorporated, New
York, N.Y., a corporation of New York
Filed Aug. 3, 1965, Ser. No. 476,834
18 Claims. (Cl. 29—203)

ABSTRACT OF THE DISCLOSURE

Individual articles of a series, having differences in a property which it is desired to detect, are tested and then sorted into groups in accordance with the test results. One article from each group so sorted may later be assembled. First and second article carriers are arranged such that the first separates an article from the series and carries it into engagement with the second, after which the article is tested while sandwiched between the carriers. After this, the first carrier releases the tested article to the second, which then transports it to a selected receiving location.

---

This invention relates generally to apparatus for testing a series of articles and sorting them into groups in accordance with the test results, and also to apparatus for assembling together one article from each group so tested and sorted. More particularly, the invention relates to testing, sorting and assembling polarized semiconductor wafers. Accordingly, the general objects of the invention are to provide new and improved apparatus of such character.

In the manufacture of certain electrical components, for example varistors having diffused silicon wafers, it is required that two polarized wafers be positioned adjacent to each other, one with its negative face up (n-type), and the other with its positive face up (p-type). A first lead is then secured across the negative and positive faces that are up, and a second lead is secured across the positive and negative faces that are down; and the unit is then encapsulated.

Another object of the invention is to provide new and improved apparatus for testing the polarity of a series of such semiconductor wafers, sorting the wafers into two groups in accordance with the test results, one group of wafers having their positive faces up and the other having their negative faces up, and then assembling one wafer from the first group with one from the second group.

In accordance with certain prior-known apparatus for assembling wafers for such varistors (such as disclosed in J. J. Monahan Patents 3,104,760 and 3,147,867), it has been necessary to provide a separate station at which the leading wafer of a group of wafers was isolated from succeeding wafers and then tested to determine its polarity. The wafer was then moved to another station, either for grouping with other wafers of like polarity, or, in another approach, for reorientation. The movement of a wafer to the isolation and testing station added a step to the operation, but it was believed necessary if the characteristics of the wafer under test (and not an adjacent one) were to be tested accurately.

A further object of the invention is to provide improved wafer handling mechanisms for picking up the leading wafer from a row of wafers, without interfering with a following wafer, testing the polarity of the wafer while engaged by the pickup member, and then transporting the tested wafer to a selected receiving location.

A further object of this invention is to provide improved apparatus of such type wherein, after testing, the wafers are grouped on separate vibratory tracks according to polarity, and unacceptable wafers are eliminated from the system.

A related object is to provide improved mechanisms for handling and transferring minute wafers to such vibratory tracks, to avoid a tendency of the wafers to become piled up or "piggy backed" on the vibratory tracks, thus avoiding empty areas along the tracks and a congested area at the loading end.

Another object is to provide improved wafer handling mechanisms designed to remove simultaneously the leading p-type wafer and the leading n-type wafer and to transport the wafers to a station where they are assembled.

With these and other objects in mind, an apparatus in accordance with the invention includes facilities for testing articles, sorting them according to their characteristics into groups as determined by the test and then assembling together one article from each group. Facilities are provided for separating an article to be tested from a supply of the articles. After the test, the article is transported to a receiving location selected in accordance with the test to sort the articles into groups. Subsequently, one article is removed from each group and assembled together with an article from the other group(s).

Initially, the articles are fed to a work position where a first article carrier is positioned on one side of the article to be tested, and a second article carrier is positioned on the other side of the article in alignment with the first carrier. The first carrier is advanced to engage the article and carry it to the second carrier whereupon the article is tested. After the first carrier is retracted, the second carrier, with the tested article, is advanced to a selected receiving location to form separate groups in accordance with the results of the test.

Preferably, the article carriers comprise upper and lower vacuum pickup test probes. Vacuum is applied to the lower probe, which is elevated to lift a leading wafer from a feed track and sandwich it between the two probes for testing. The contacting portions of the probes are electrically conductive, and form elements of a polarity test set. After testing, with vacuum applied to the upper probe, the lower probe is retracted leaving the tested wafer supported by the upper probe. The upper probe is then moved into alignment with a selected one of at least two receiving tracks, in accordance with the test results, and the vacuum is terminated to deposit the wafer on the selected receiving track. A special transfer mechanism picks up one wafer from each track and deposits them at the assembly station.

Other objects, advantages and aspects of the invention will become apparent by reference to the following detailed description and drawings of a specific embodiment thereof, wherein.

General arrangement

Figures 1, 2:
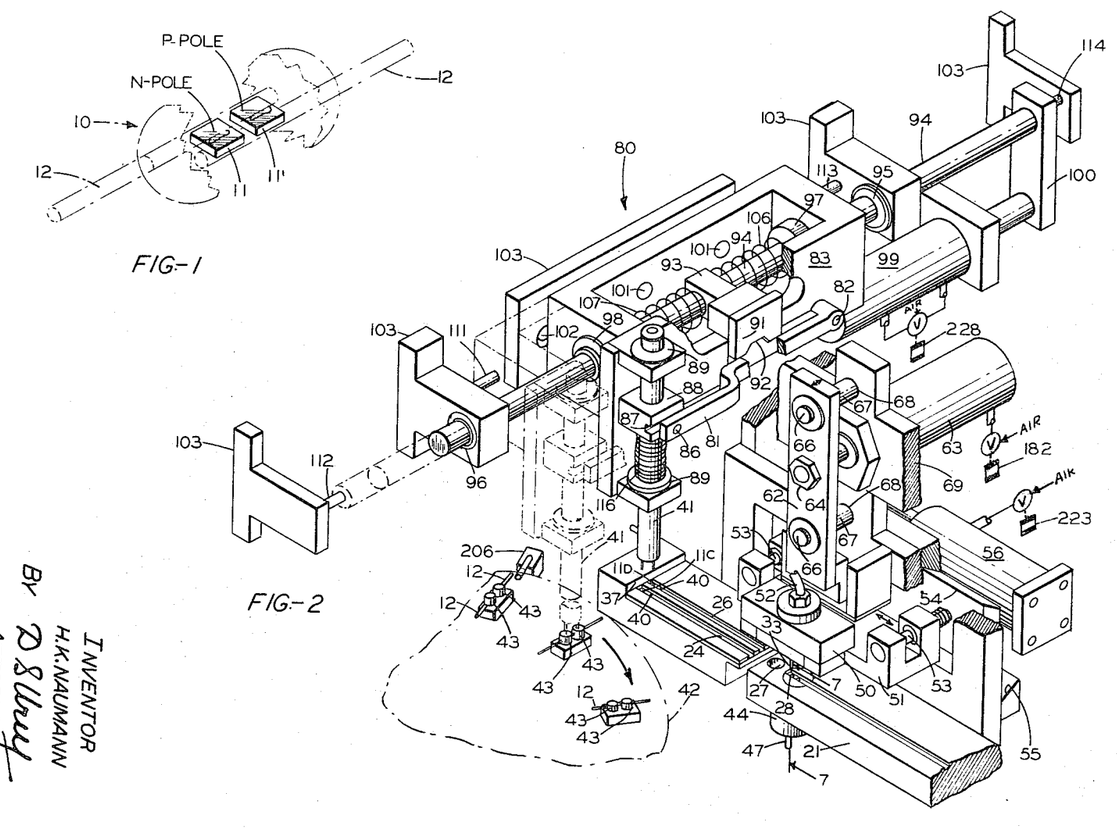
FIG. 1 is a perspective view of an electrical component, such as a varistor, showing the orientation of a pair of spaced wafers, one having its p-pole uppermost and the other having its n-pole uppermost.
FIG. 2 is a schematic perspective drawing of the apparatus embodying the principles of the invention, showing facilities for separating, testing, sorting and then assembling the wafers into the configuration shown in FIG. 1.

In FIG. 1, there is shown an electrical component 10 which is typical of articles which may be assembled by the apparatus of the instant invention. In this example, the component 10 is a varistor of conventional design having a first semiconductor wafer 11 and a second wafer 11'. The wafer 11 is positioned with its negative pole uppermost, whereas the wafer 11' is positioned with its positive pole uppermost. Leads 12—12 are soldered to the wafers 11 and 11' at a subsequent station and then the unit is encapsulated.

Figures 3, 4, 5:
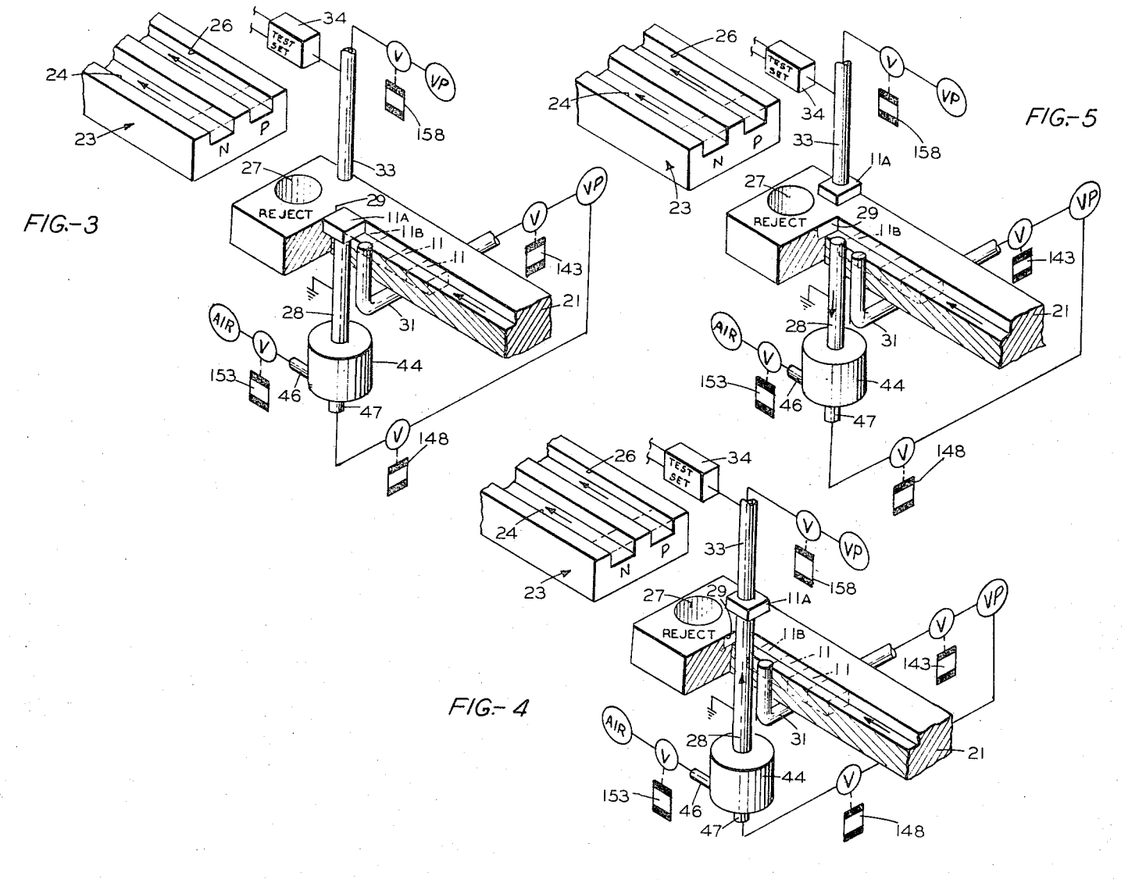
FIGS. 3-6 are fragmentary perspective views of an apparatus embodying the principles of the invention, showing the sequence of steps for separating, testing, sorting and then assembling the wafers.

In FIG. 3, there is shown a first vibratory track 21 having a single column of wafers 11—11 supplied by a vibratory feeder (not shown) such as that sold under the trademark "Syntron." Some of the wafers 11—11 have their p-poles uppermost; whereas, other wafers have their n-poles uppermost and additionally, some of the wafers have unacceptable electrical characteristics. It is desired to group the wafers on a dual vibratory feeder 23 having a first track 24 for receiving wafers having their n-poles uppermost and a second track 26 having wafers with their p-poles uppermost. A reject chute 27 collects those wafers which have unacceptable electrical characteristics.

A vacuum pickup 28, mounted for vertical reciprocation, is positioned beneath the leading wafer 11A which is abutting against a stop member 29. A vacuum hold-down 31 retains the next successive wafer 11B in the row in order to prevent inadvertent feeding of two wafers. Vertically aligned above the vacuum pickup 28 is a vacuum pickup test probe 33 which is electrically connected to a test set 34.

In FIG. 4, the vacuum pickup 28 (vacuum on) is raised vertically to sandwich the leading wafer 11A between the vacuum pickup 28 and the vacuum pickup test probe 33. Simultaneously, a vacuum is applied to the vacuum hold-down 31 to retain the next wafer 11B. The test set 34 determines the polarity and the acceptability of the wafer 11A in this position.

In FIG. 5, the vacuum pickup 28 is lowered leaving the tested wafer 11A gripped by the vacuum pickup test probe 33.

Figure 6:
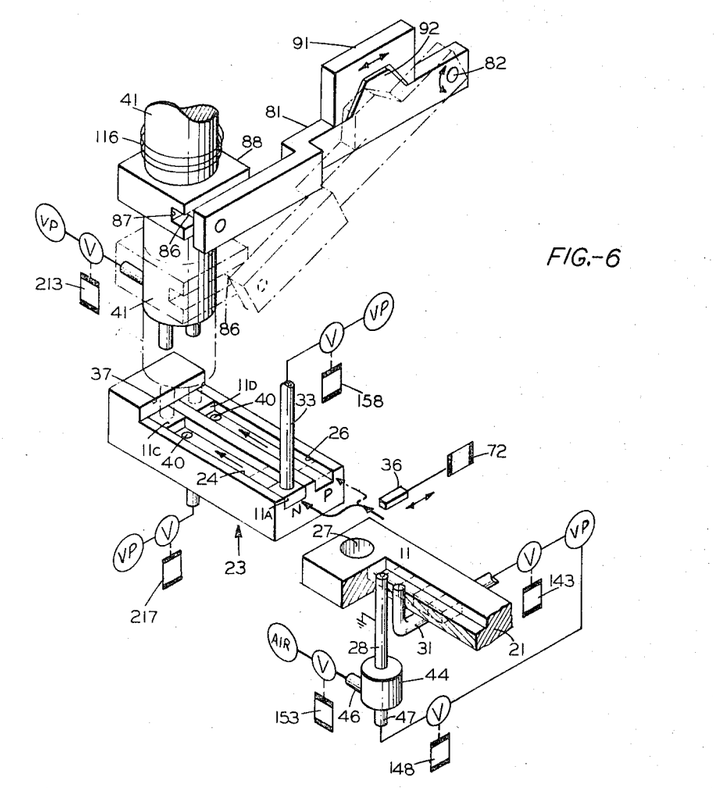

In FIG. 6, the test probe 33 is moved horizontally to place the wafer 11A either in the n-type track 24 or the p-type track 26; or if the test indicates that the wafer 11A is unacceptable, the movement of the test probe 33 is interrupted over the reject chute 27 by a stop member 36. The vacuum on the test probe 33 is then terminated to release the wafer 11A in the selected place. It should be noted that as the wafer 11A is fed into the track 24 (FIG. 6), for example, it physically pushes the preceding wafer along that track. This avoids the previous problem of the wafers becoming piggy backed when they failed to feed along the track properly. The vacuum on the hold-down 31 is then terminated to allow advancement of the net wafer 11B into a position over the vacuum pickup 28.

The acceptable wafers are advanced along the vibratory tracks 24 and 26 until they reach an abutment 37 which prevents further movement. A dual vacuum pickup 41 is vertically aligned above the leading wafers 11C and 11D and is moved downwardly with the vacuum on to pick up the two leading wafers. A pair of vacuum hold-downs 40—40 retain succeeding wafers on the tracks 24 and 26. The vacuum pickup 41 is raised and then moved laterally (FIG. 2) to a position over a rotary turret 42 having nests 43—43. The vacuum pickup 41 is lowered to place the wafers 11C and 11D in the aligned nests 43—43. The vacuum is terminated to release the wafers, and the vacuum pickup is raised and returned to a position over the tracks 24 and 26.

Testing and sorting apparatus

In FIG. 2, there is shown the apparatus for elevating the leading wafer 11A from the vibratory track 21, testing the polarity and acceptability of the wafer, and then transferring the wafer to either the n-type track 24, the p-type track 26 or the reject chute 27. The vacuum pickup 28 is movable upward by an air cylinder 44 (FIG. 7) having air supplied through a tube 45, and downwardly by a spring 46. Vacuum is supplied to the vacuum pickup 28 through a tube 47 and to the hold-down 31 through a tube 48.

Figure 8:
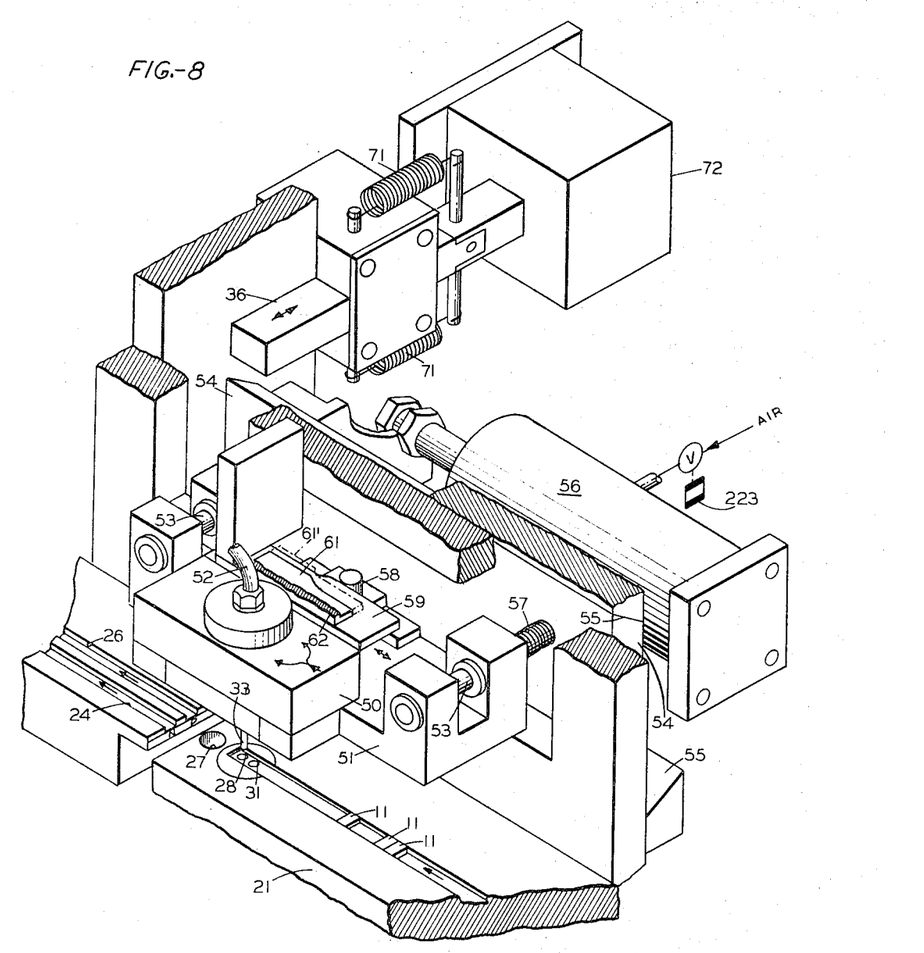
FIG. 8 is an enlarged, schematic, perspective view of FIG. 2, with portions removed, showing details of the mechanism for controlling the horizontal movement of the upper vacuum pickup test probe in response to the test.

Referring to FIG. 8, the vacuum pickup test probe 33 is mounted and electrically insulated in a housing 50 secured to a reciprocable carriage 51. Vacuum is supplied to the test probe 33 by a tube 52 in the top of the housing 50. Advancement of the carriage 51 moves the test probe 33 from a position directly over the lower vacuum pickup 28 to a position over one of the vibratory tracks 24 or 26 or over the reject chute 27. The carriage 51 is secured by a pair of rods 53—53 to a tenon 54 which is reciprocable in a mortise 55 by an air cylinder 56.

A pair of compression springs 57 (only one shown) normally urges the carriage 51 toward the lower left (FIGS. 2 and 8). Mounted on the carriage 51 is a follower roller 58 which rides along the surface of a cam 59. Another cam 61 is slidably mounted above the cam 59 for movement into a position shown by the phantom line 61', in response to a test which indicates that the wafer being tested has a p-type polarity. Movement of the cam 61 is accomplished by reciprocation of a plate 62 (FIG. 2) on the bottom of which the cam 61 is connected. The plate 62 is driven in turn by an air cylinder 63 connected to the plate 62 by a bolt 64.

The movement of the plate 62 is guided by a pair of guide rods 66—66 which slide in bushings 67—67 mounted on the plate 62. The guide rods 66—66 are supported on a vertical frame 69. Actuation of the air cylinder 63, in response to a test indicating a p-type wafer, retracts the plate 62 (toward the upper right in FIG. 2) to move the cam 61 into the position shown in phantom lines (FIG. 8). Thus, as the carriage 51 is advanced toward the vibratory tracks 24 and 26, the follower roller 58 is cammed toward the vibratory track 26. If the test indicates that the wafer being tested is an n-type, the cam 61 is not moved into the phantom line position and the roller 58 follows the surface of the cam 59 which places the test probe 33 over the vibratory track 24.

In the event the test indicates that the wafer has unacceptable electrical characteristics, a mechanism is provided for interrupting the movement of the test probe 33 over the reject chute 27. This mechanism includes the stop member 36 (FIGS. 6 and 8), which is urged normally by tension springs 71—71 into the position shown, for interrupting the advancement of the air cylinder 56. If the stop member 36 is not retracted, the carriage 51 is advanced only far enough to position the test probe 33 over the reject chute 27. When the vacuum is terminated on the test probe 33, the unacceptable wafer is discharged into the chute 27. If the test indicates that the wafer is acceptable, the stop 36 is moved toward the upper right (FIG. 8) by energization of a solenoid 72. When the solenoid 72 is de-energized, the stop 36 is returned to its normal interrupting postion by the springs 71—71. Thus, under normal conditions when the test set 34 determines that the wafer under test is acceptable, the stop 36 is withdrawn from its interrupting position and the air cylinder 56 is allowed to advance the carriage 51 and the test probe 33 through a full stroke which places the test probe 33 over one of the vibratory tracks 24 or 26.

Transfer apparatus

After the wafers 11—11 have been tested and sorted onto one of the tracks 24 or 26, a supply of the wafers is built up with the leading wafers 11C and 11D (FIGS. 2 and 6) in each track 24 and 26 abutting the stop member 37. A transfer apparatus generally designated 80, which includes the vacuum pickup 41, is provided for picking up the leading wafers 11C and 11D and positioning them in the nests 43—43 on the rotary turret 42. The vacuum pickup 41 is moved down to pick up the wafers 11C and 11D and then up and laterally to a position over the nests 43—43 where the vacuum pickup 41 is again moved down to release the wafers 11C and 11D in the nests 43—43.

The apparatus for providing this movement includes a pivotable arm 81 mounted on a pin 82 which is connected to a carriage 83. A roller 86, mounted on the end of the arm 81, rides in a groove 87 of a block 88 which is fixedly attached to the vacuum pickup 41. The vacuum pickup 41 is supported for vertical movement in bearings 89—89 which extend laterally from the carriage 83. Pivotal movement of the arm 81 is effective to lower the vacuum pickup 41 in aligned position over the wafers 11C and 11D. The arm 81 is pivoted by a cam 91 which engages a raised follower 92 on the arm 81. The cam 91 in turn is connected to a collar 93 which is pinned to a movable shaft 94 which is supported in bearings 95 and 96. The shaft 94 in turn supports the carriage 83 on bearings 97 and 98. The shaft 94 is driven back and forth by a solenoid operated air cylinder 99 which is connected to the shaft 94 by a link 100. The carriage 83 has guide pins 101—101 which are slidably received in an elongated slot 102 in a stationary frame 103.

The reciprocation of the shaft 94 is normally transmitted to the carriage 83 by a compression spring 107 in a forward direction (lower left, FIG. 2) and a compression spring 106 in a reverse direction (upper right, FIG. 2). Mounted on the frame 103 is a first stop 111 which is aligned with a portion of the carriage 83 and a second stop 112 which is aligned with the shaft 94 on its forward stroke. Also, mounted on the frame 103 is a third stop 113 which is aligned with a rearward portion of the carriage 83 and a fourth stop 114 which is aligned with the shaft 94 on its reverse stroke.

With the vacuum pickup 41 aligned above the leading wafers 11C and 11D (FIGS. 2 and 6) and with the rearward portion of the carriage 83 abutting against the stop 113, the shaft 94 is moved in a reverse direction (upper right). Since the carriage 83 cannot move with the shaft 94, the spring 106 is compressed and the cam 91 which is pinned to the shaft 94 has relative movement with respect to the follower 92. This cams the pivotable arm 81 and the vacuum pickup 41 downwardly, thereby compressing a spring 116 mounted between the block 88 and the lower bearing 89. This motion continues until the shaft 94 abuts the stop 114. Vacuum is applied to grip the leading wafers 11C and 11D while the vacuum pickup 41 is in the down position.

With the vacuum still on, the movement of the shaft 94 is reversed by the air cylinder 99 to move the shaft 94 in a forward direction (lower left, FIG. 2). During the initial part of the forward movement of the shaft 94, the compression on the spring 106 is relieved, and the pivotable arm 81 is allowed to rise under the influence of the compression spring 116. Continued movement of the shaft 94 partially compresses the spring 107 to apply forward translatory motion to the carriage 83 and the vacuum pickup 41. This motion continues until the vacuum pickup 41 is advanced to the position (shown in phantom lines, FIG. 2) above the nests 43—43. With the vacuum pickup 41 so positioned, the forward portion of the carriage 83 strikes the stop 111 to prevent further advancement of the carriage 83. The shaft 94 continues to move in the forward direction until it strikes the stop 112 which again causes relative movement between the cam 91 and the follower 92. This compresses the springs 107 and 116 to pivot the arm 81 downwardly. With the wafers 11C and 11D positioned in the nests 43—43, the vacuum is terminated to release the wafers. The air cylinder 99 is then operated in a reverse direction to lift the vacuum pickup 41 and then transfer the vacuum pickup to a position over the dual vibratory tracks 24 and 26, whereupon the cycle is repeated.

Operation

Figure 9A:
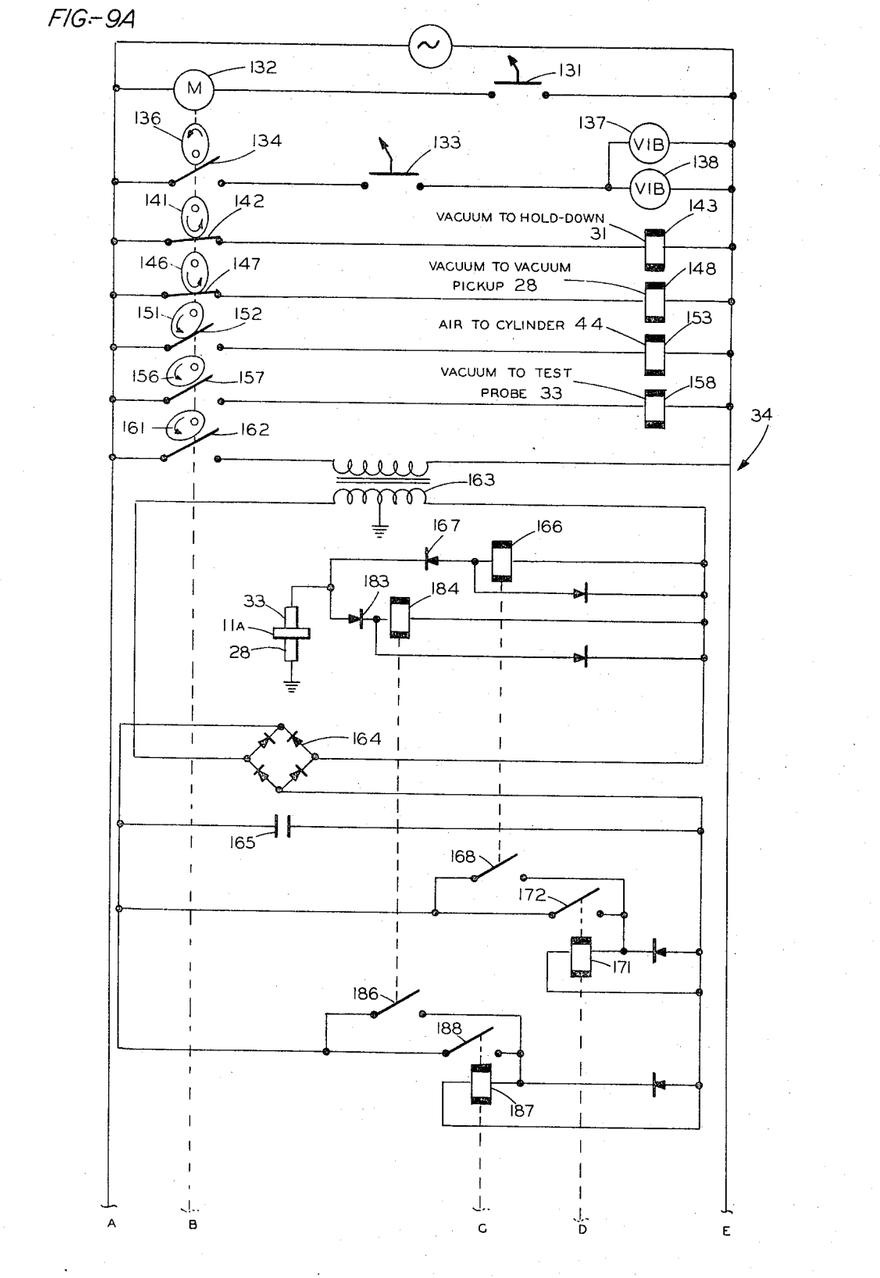
FIGS. 9A and 9B are schematic diagrams illustrating control facilities for the apparatus.
Figure 9B:
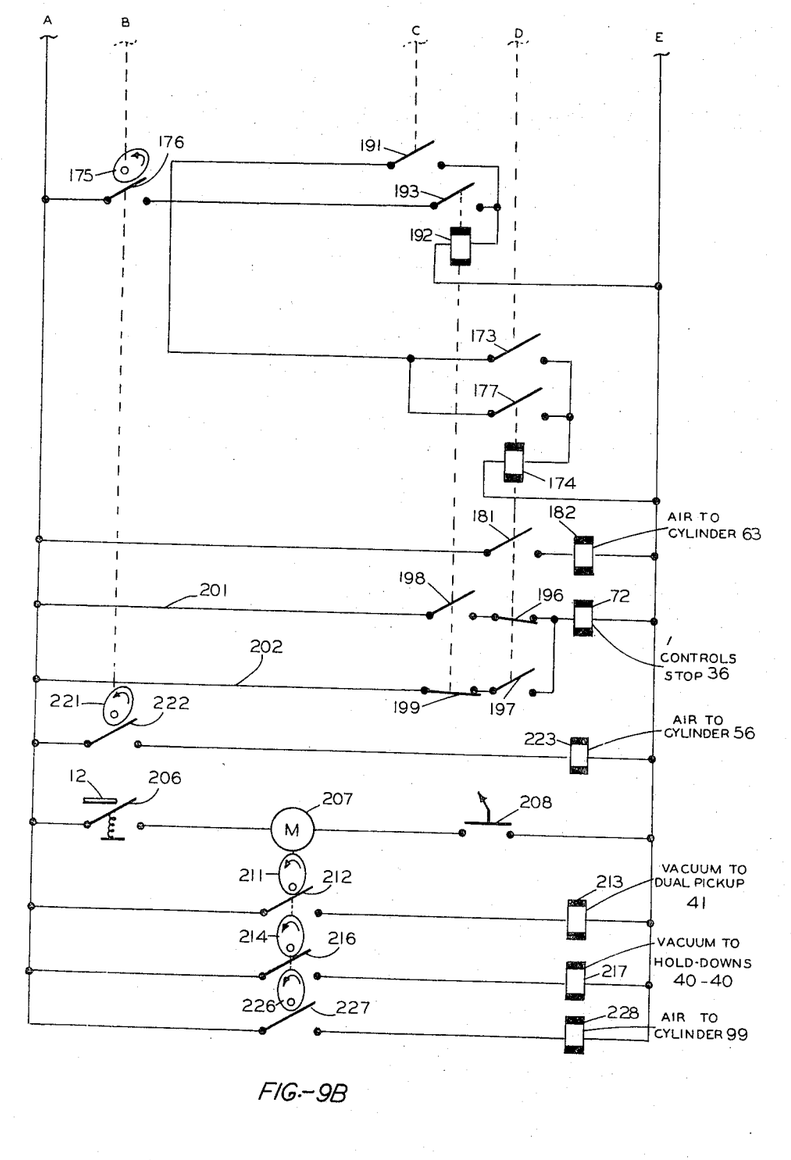
Figure 10:
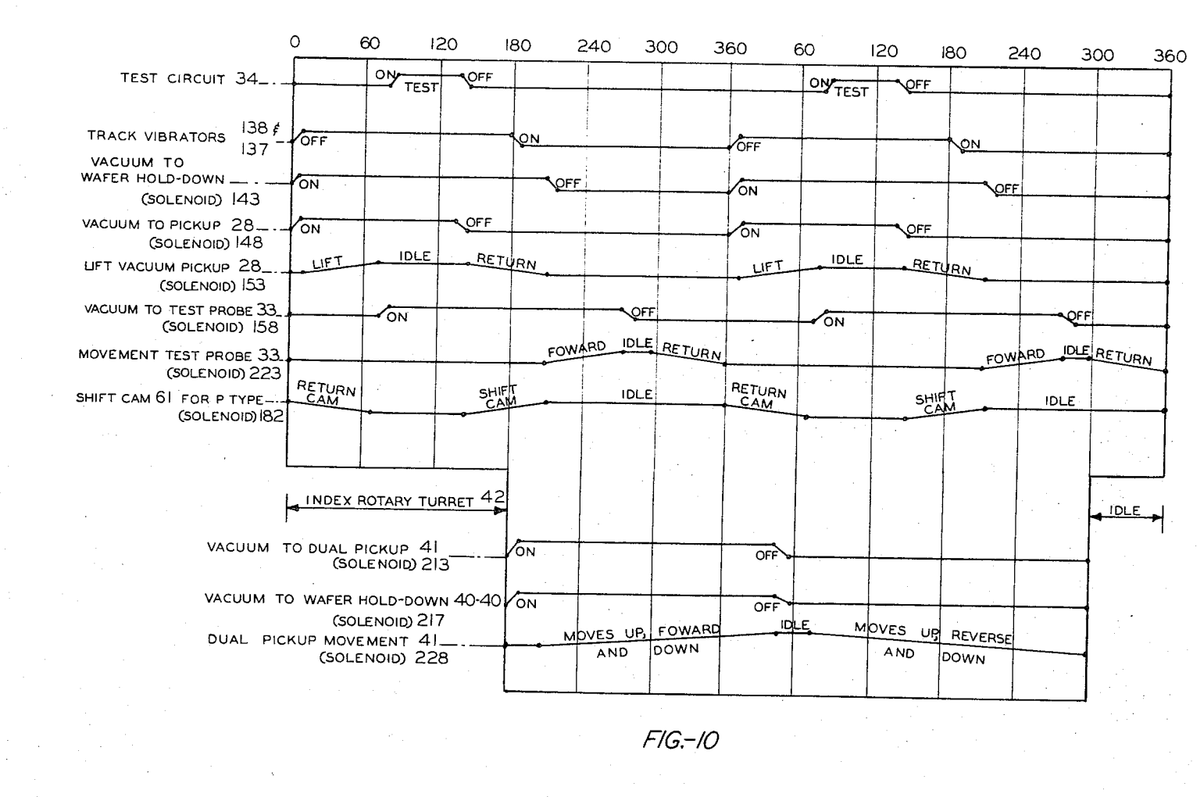
FIG. 10 is a timing chart indicating the sequence of operation of the various mechanisms included in the apparatus.

Referring to FIGS. 9A, 9B and 10, there is shown a circuit for controlling the operation of the apparatus and a timing chart indicating the synchronized movements of the various mechanisms. Initially, it is assumed that a wafer 11A has been positioned as shown in FIG. 3 with the vacuum pickup 28 in the down position, and the vacuum pickup test probe 33 vertically aligned thereabove. At this time, the rotary turret 42 is prepared to index to present the next succeeding empty nests 43—43.

In order to initiate cyclic operation of the apparatus, a cycle start switch 131 is closed to complete a circuit to a motor 132. The motor 132 drives a shaft (not shown) which has a plurality of timing cams (described hereinafter) mounted thereon for controlling the timed operation of various mechanisms. Closure of a second switch 133 and closure of a switch 134 by a first cam 136, driven by the motor 132, completes a circuit through a pair of vibrators 137 and 138 for simultaneously applying vibratory motion to the track 21 and the tracks 24 and 26, respectively.

At 0° of the cycle of operation, the cam 136 opens the switch 134 and de-energizes the vibrators 138 and 137 to stop the feeding of wafers on the tracks 21, 24 and 26. Also, at 0° a cam 141 closes a switch 142 to complete a circuit through a solenoid 143 (FIGS. 3-6) which controls the application of a vacuum to the hold-down 31 to hold the wafer 11B in position on the track 21. Simultaneously, a cam 146 closes a switch 147 which completes a circuit through a solenoid 148, which controls the application of vacuum to the vacuum pickup 28, to hold the wafer 11A in place on the vacuum pickup 28.

At approximately 10° of the cycle, a cam 151 closes a switch 152 which completes a circuit through a solenoid 153, which operates the air cylinder 44 (FIGS. 4 and 7) to commence raising the vacuum pickup 28 toward the vacuum pickup test probe 33.

At approximately 70° of the cycle, the vacuum pickup 28 reaches its raised position, depicted in FIG. 4, with the wafer 11A sandwiched between the vacuum pickup 28 and the test probe 33. Simultaneously, a cam 156 closes a switch 157 which completes a circuit through a solenoid 158, which controls the application of vacuum to the test probe 33, to enable the subsequent transfer of the wafer 11A from the vacuum pickup 28 to the test probe 33.

At 80° of the cycle, with the wafer 11A sandwiched between the vacuum pickup 28 and the test probe 33, a cam 161 closes a switch 162 which completes a circuit through a transformer 163. The transformer supplies power to the test set 34 which includes a bridge rectifier 164 and a filter capacitor 165 of conventional design. A test circuit senses the polarity of the wafers or an open or a short-circuited wafer. It is to be understood that other test sets can be used which test the wafers for other characteristics, as this particular test set forms no part of the instant invention.

If the wafer 11A under test has its p-pole up, a circuit is completed through a relay 166, a rectifier 167, the test probe 33, the wafer 11A and the vacuum pickup 28 to ground. Energization of the relay 166 closes a contact 168 which completes a circuit through a relay 171. Energization of the relay 171 closes a contact 172 to complete a locking circuit around the contact 168. Energization of the relay 171 also closes a contact 173 which completes a circuit through a relay 174 so long as a cam 175 (which is controlled by the motor 132) maintains a switch 176 closed. Energization of the relay 174 closes a contact 177 which completes a locking circuit around the contact 173. Energization of the relay 174 also closes a contact 181 which completes a circuit through a solenoid 182 which controls the application of air to the air cylinder 63 (FIG. 2). If the test set 34 senses that a p-type wafer is under test, the solenoid 182 is energized which retracts the shaft of the air cylinder 63 (FIG. 2), the plate 62 and the cam 61 (FIG. 8) to the upper right. The follower roller 58 follows the cam 61 and the wafer is deposited on the track 26.

If the wafer 11A under test has its n-pole up, then a circuit is completed through the vacuum pickup 28, the wafer 11A, the test probe 33, a rectifier 183 and a relay 184. Energization of the relay 184 closes a contact 186 which completes a circuit through a relay 187. Energization of the relay 187 closes a contact 188 which completes a locking circuit around the contact 186. Energization of the relay 187 also closes a contact 191 which completes a circuit through a relay 192 so long as the cam 175 maintains the switch 176 closed. Energization of the relay 192 closes a contact 193 to complete a locking circuit around the contact 191. With an n-type wafer under test, the air cylinder 63 is not actuated and, therefore, the cam 61 does not shift but, instead, the follower roller 58 follows the cam 59 (FIG. 8) to place the wafer in the track 24.

If the wafer 11A has an open or a short circuit, it is desired that the wafer be released over the reject chute 27 instead of into either of the tracks 24 and 26. As previously described, energization of the solenoid 72 (FIG. 8) moves the stop 36 out of the path of movement of the shaft of the air cylinder 56 which allows the carriage 51 and the test probe 33 to be advanced a full stroke. However, if the stop 36 is not withdrawn from the path of the shaft of the air cylinder 56, the defective wafer is released over the reject chute 27.

If the wafer under test has a short circuit, both of the relays 166 and 184 are energized. These, in turn, energize the relays 171 and 187 which energize the relays 174 and 192, respectively. Energization of the relay 174 opens a normally closed contact 196 and closes a contact 197. Energization of the relay 193 closes a contact 198 and opens a normally closed contact 199. Thus, no circuit is completed through either of the conductors 201 or 202. Consequently, the reject solenoid 72 is not energized, the stop 36 remains in place and the short-circuited wafer is released over the reject chute 27.

If the wafer under test has an open circuit, neither of the relays 166 or 184 is energized during the testing cycle. Thus, the relays 171 and 187 are not energized nor are the relays 174 and 192. If the relays 174 and 192 are not energized, the contacts 196–199 are unchanged, and a circuit is not completed through either of the conductors 201 or 202. Consequently, the reject solenoid 72 is not energized, the stop 36 remains in place and the open-circuited wafer is released over the reject chute 27.

At approximately 140° of the cycle, the testing of the wafer 11A is completed, and the cam 161 opens the switch 162 to de-energize the test set 34. At the same time, the cam 146 opens the switch 147 to de-energize the solenoid 148 and terminate the vacuum on the vacuum pickup 28.

Figure 7:
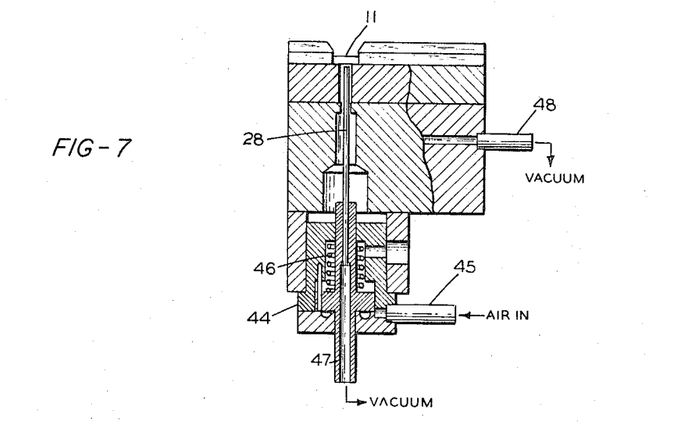
FIG. 7 is a cross-sectional view taken along line 7—7 of FIG. 2, showing the lower vacuum pickup mechanism.

At approximately 145° of the cycle, the cam 151 opens the switch 152 which de-energizes the solenoid 153 to allow lowering of the vacuum pickup 28 by the spring 46 (FIG. 7). At the same time, the solenoid 182 shifts the cam 61 if the test set 34 determines that the wafer 11A has its p-pole up.

At 180° of the cycle, the cam 136 is effective to close the switch 134 and, if the switch 133 is closed, vibrators 137 and 138 are energized to vibrate the track 21, and the tracks 24 and 26, respectively, to commence feeding of the wafers thereon. At this time, the vacuum pickup 28 still is being lowered, and the cam 61 still is being shifted (if the p-pole is up).

Also at 180°, operation is commenced on the transfer apparatus 80 (FIGS. 2 and 6) which has been idle for the first 180° of operation of the testing and sorting apparatus. During this idle period, the rotary turret 42 is indexed to present the succeeding empty nests 43—43. At this time, a limit switch 206 (FIG. 2) senses the presence of leads 12—12 in the next nest 43 and completes a circuit to a second motor 207 (assuming a starting switch 208 is closed). The motor 207 drives a shaft (not shown) which as a plurality of timing cams mounted thereon for controlling the timed operation of the transfer apparatus 80. At 180° a cam 211 driven by the motor 207 closes a switch 212 to energize a solenoid 213. The solenoid 213 controls the application of vacuum to the dual pickup 41, which is in its retracted-down position, and the vacuum is turned on to pick up the wafers 11C and 11D (FIG. 6). Simultaneously, a cam 214 closes a switch 216 to complete a circuit through a solenoid 217, which controls the application of vacuum to the hold-downs 40—40 (FIG. 6), and vacuum is then applied.

At approximately 210° of the cycle, the vacuum pickup 28 has returned to its lower position (FIG. 5) and the cam 141 opens the switch 142. This de-energizes the solenoid 143 and turns off the vacuum on the hold-down 31 to allow the wafer 11B to feed forward. Also, the cam 61 reaches its shifted position (upper right in FIG. 8) if the p-pole is up. Simultaneously, a cam 221, driven by the motor 132, closes a switch 222 to energize a solenoid 223 which controls the application of air to the air cylinder 56. The air cylinder 56 advances the carriage 51 and the test probe 33 to position the wafer 11A in either the track 24 or the track 26 in accordance with the test and the position of the cam 61.

Also, at 210°, with the vacuum applied to the dual pickup 41 and the hold-downs 40—40, a cam 226 closes a switch 227 to complete a circuit through a solenoid 228 which controls the application of air to the air cylinder 99. This moves the shaft 94 toward the lower left (FIG. 2), initially to raise the dual pickup 41, and then to move the dual pickup 41 laterally toward the empty nests 43—43.

At approximately 270° of the cycle, the test probe 33 reaches its forward position over either track 24 or 26 (assuming the wafer is acceptable). Immediately thereafter, the cam 156 opens the switch 157 which de-energizes the solenoid 158 and turns off the vacuum to the test probe 33, thus releasing the tested wafer in the appropriate p-type or n-type track.

At approximately 295° of the cycle, after the test probe 33 has paused for release of the tested wafer, the cam 221 opens the switch 222 which de-energizes the solenoid 223 and reverses the application of air to the air cylinder 56 to return the carriage 51 and the test probe 33 to their initial position (lower right corner in FIGS. 2 and 8).

At 360° of the cycle, the test probe 33 returns to its initial position and the cam 175 opens the switch 176 to de-energize and reset the relays 174 and 192 for the next cycle. As the relay 174 is de-energized, the contact 181 opens which de-energizes the solenoid 182, controlling the application of air to the air cylinder 63, to return the cam 61 to its normal position (lower left FIG. 8). The cam then returns to that position during approximately the first 65° of the next cycle of operation. The various other operations of the testing and sorting apparatus which were described from 0°–360° are repeated in the next cycle, while the transfer apparatus 80 is completing one cycle.

At 360° of the cycle, the dual pickup 41 is continuing its movement to the lower left (FIGS. 2 and 6) until at approximately 45° of the second cycle, it reaches a position immediately over the empty nests 43—43. A few moments earlier, the carriage 83 struck the stop 111 and the cam 91 pivoted the arm 81 to move the dual pickup 41 downwardly into the nests 43—43. As the dual pickup 41 pauses, the cam 211 opens the switch 212 to de-energize the solenoid 213 and terminate the vacuum to the dual pickup 41 to release the wafers 11A and 11B. Also, the cam 214 opens the switch 216 to de-energize the solenoid 217 and terminate the vacuum on the holddowns 40—40 to allow further advancement of the wafers on the tracks 24 and 26.

At approximately 75° of the second cycle, the cam 226 opens the switch 227 to de-energize the solenoid 223. This reverses the application of air to the cylinder 99 to retract the shaft 94 toward the upper right (FIG. 2).

At 300° of the second cycle, the dual pickup 41 returns to a position immediately above the tracks 24 and 26 and is cammed downwardly by the cam 91 engaging the follower 92 after the carriage 83 strikes the stop 113. The dual pickup 41 now is ready to receive the next two leading wafers for transfer to the rotary turret 42.

As can be seen, the testing and sorting apparatus completes two cycles of operation while the transfer apparatus completes one cycle of operation. However, since the transfer operation involves two wafers whereas the testing and sorting operation involves only one wafer, the two apparatus generally work in unison, disregarding those wafers which are rejected. Under normal conditions, a less than capacity supply of tested wafers is provided on the tracks 24 and 26 so that the testing, sorting and transfer apparatus may be continuously operated without interruption. If the tracks 24 and 26 become filled, a photoelectric cell (not shown) temporarily interrupts the operation of the testing and sorting apparatus.

In order to stop the operation under normal conditions, the cycle start switch 131 is opened to de-energize the motor 132 which controls the rotation of the various cams 136, 141, 146, 151, 156, 161, 175 and 221. Likewise, the transfer apparatus 80 is stopped by opening the switch 208 which stops the motor 207 controlling the rotation of cams 211, 214 and 226.

It is to be understood that the above-described arrangements of apparatus and construction of elemental parts are simply illustrative of an application of the principles of the invention, and many other modifications may be made without departing from the invention.

What is claimed is:

1. Apparatus for testing a series of articles, sorting them into groups in accordance with the test results, and then assembling together one article from each group, which comprises:
    means for supplying successive articles to a work position;
    means for elevating an article at the work position to separate that article from the supply and, after a pause, for releasing that article;
    transporting means, vertically aligned with the elevating means, for receiving the article from the elevating means and for releasing the article, the article being sandwiched between the elevating means and the transporting means during the pause;
    means, operable during the pause, for testing the article to determine in which of the groups it belongs;
    means for moving the transporting means to a selected one of at least two receiving locations in accordance with the results of the test, the transporting means releasing the article at the selected receiving location to sort the articles into groups; and
    means for removing one article from each group and assembling the articles together.

2. Apparatus as recited in claim 1, wherein:
    the articles comprise electrical components having sides of opposite polarity;
    the contacting portions of the elevating means and the transporting means are electrically conductive; and
    the testing means determines the polarity of the component by passing a current through said conductive, contacting portions and through the component as it is sandwiched between the elevating and transporting means.

3. Apparatus as recited in claim 1, wherein said removing and assembling means includes:
    a multiple pickup device having an article-gripping portion for grasping one article in each group;
    means for momentarily lowering the pickup device at the receiving locations to grasp an article from each group;
    means for laterally transferring the pickup device with the articles to carry the articles to aligned positions above an assembly station; and
    means for momentarily lowering the pickup device to deposit the articles together at the assembly station.

4. Apparatus as recited in claim 3, wherein said removing and assembling means further includes:
    a reciprocable shaft;
    a carriage mounted for reciprocable movement with the shaft, said pickup device being pivotally connected to the carriage;
    a spring for normally urging the pickup device upwardly;
    resilient means interposed between the shaft and the carriage for conveying forward and reverse movement of the shaft to the carriage;
    means for stopping the forward and reverse movement of the carriage so that the pickup device is vertically aligned with the deposit position and pickup position, respectively;
    means for stopping the forward and reverse movement of the shaft after a predetermined amount of overtravel beyond the carriage;
    a cam mounted on the shaft for lowering the pickup device against the spring during the overtravel of the shaft and then allowing return of the pickup device during the opposite movement of the shaft; and
    means for reciprocating the shaft and the pickup device to grasp articles from the groups and then transfer and deposit the articles together.

5. Apparatus for picking up an article, transferring the article laterally from a first position to a second position and then lowering the article, which apparatus comprises:
    a reciprocable shaft;
    a carriage mounted for reciprocable movement with the shaft;
    a first resilient means interposed between the shaft and the carriage for conveying reverse movement of the shaft to the carriage;
    a second resilient means interposed between the shaft and the carriage for conveying forward movement of the shaft to the carriage;
    a pickup device pivotally connected to the carriage for grasping and subsequently releasing an article;
    a spring for normally urging the pickup device upwardly;
    a first stop member aligned with the carriage for stopping the rearward movement of the pickup device over the first position;
    a second stop aligned with the carriage for stopping the forward movement of the pickup device over the second position;
    a cam fixedly attached to the shaft for engaging and lowering the pickup device after the reverse and forward movement of the carriage is terminated by the first and second stop members, respectively;
    means for moving the shaft in a reverse direction so that the carriage strikes the first stop and as the shaft continues against the force of the first resilient means the cam urges the pickup device downward against the force of the spring for grasping an article; and
    means for then moving the shaft in a forward direction to raise the pickup device by the spring, and transfer the article from the first position to the second position whereupon the carriage strikes the second stop and as the shaft continues against the force of the second resilient means the cam urges the pickup device downwardly for release of the article.

6. Apparatus for testing a series of articles and sorting them into groups in accordance with the test results, which comprises:

means for supplying successive articles to a work position;

means for elevating an article at the work position to separate that article from the supply and, after a pause, for releasing that article;

transporting means, vertically aligned with the elevating means, for receiving the article from the elevating means and for releasing that article, the article being sandwiched between the elevating means and the transporting means during the pause;

means, operable during the pause, for testing the article to determine in which of the groups it belongs; and means for moving the transporting means to a selected one of at least two receiving locations in accordance with the results of the test, the transporting means releasing the article at the selected receiving location to sort the articles into groups.

7. Apparatus as recited in claim 6, wherein:
said transporting means includes
 a carriage; and
 a vacuum pickup test probe mounted on the carriage; and wherein
said means for moving the transporting means includes
 means for moving the carriage horizontally to move the test probe between the test position and a first receiving location; and
 cam means, controlled by the testing means, for diverting the carriage to move the test probe from the test position to a second receiving location.

8. Apparatus for testing the polarity of a series of semiconductor wafers on a first track and grouping them on a second and a third track, spaced laterally above the first track, according to their polarity, which comprises:

means for supplying a row of polarized wafers on the first track;

means, mounted beneath the first track, for elevating the leading wafer on that track to separate that wafer from the supply and, after a pause, for releasing that wafer;

transporting means, vertically aligned with the elevating means, for receiving the leading wafer from the elevating means and for releasing the wafer, the wafer being sandwiched between the elevating means and the transporting means during the pause;

means, operable during the pause, for testing the polarity of the wafer; and means for moving the transporting means to the second or the third track, the track being selected in accordance with the results of the test and the transporting means releasing the wafer on the selected track, to group the wafers according to polarity.

9. Apparatus as recited in claim 8, wherein:
said transporting means includes
 a carriage; and
 a vacuum pickup test probe mounted on the carriage; and wherein
said means for moving the transporting means includes
 means for moving the carriage horizontally to move the test probe between the test position and the second track if the wafer has one polarity; and
 cam means, controlled by the testing means, for diverting the carriage to move the test probe from the test position to the third track if the wafer has the opposite polarity.

10. Apparatus as recited in claim 8, further including:
means for detecting wafers having unacceptable electrical characteristics;
a reject receiver; and
means, operated by the detecting means, for controlling the movement of the transporting means to stop the transporting means over the reject receiver when an unacceptable wafer is tested.

11. Apparatus for testing a series of articles and sorting them into groups in accordance with the test results, which comprises:

means for feeding the articles one at a time to a work position;

a first article carrier initially positioned on one side of the work position in alignment with an article at the work position;

a second article carrier initially positioned on the other side of the work position in alignment with the first carrier;

means for moving the first carrier toward the second, so that the first carrier engages an article at the work position and carries it to a position where it also engages the second carrier;

means for testing each article in turn to determine in which of the groups it belongs;

means for retracting the first carrier to its initial position after the article has been engaged by both carriers and the test has been completed, the second carrier being designed to support the article after retraction of the first carrier;

means for moving the second carrier to a selected one of at least two receiving locations in accordance with the results of each test;

means for releasing each article in turn from the second carrier at the selected receiving location to sort the articles into groups; and means for returning the second carrier to its initial position after release of each article.

12. Apparatus as recited in claim 11, wherein:
the means for retracting the first carrier operates a predetermined time after both carriers have engaged the article, establishing a sufficient time interval during which both carriers are stationary to permit the testing operation;
the testing means operates during the time interval while both carriers are stationary; and
the article-engaging portion of at least one of the carriers constitutes an element of the testing means.

13. Apparatus as recited in claim 11, wherein:
the article carriers comprise vacuum pickups; and
means are provided for selectively applying and terminating vacuum to the pickups in the following sequence
 (a) applying vacuum to the first pickup before the article is moved from the work position;
 (b) applying vacuum to the second pickup before the first is retracted,
 (c) terminating vacuum to the first pickup after vacuum has been applied to the second and before the first is retracted, and
 (d) terminating vacuum to the second pickup after it has been moved to the selected receiving location, to release the article therefrom.

14. Apparatus as recited in claim 13, wherein:
the articles comprise electrical components to be tested by passing a current therethrough; and
the contacting portions of both pickups are of electrically conductive material and are connected to the testing means to pass testing current through the component while engaged between the pickups.

15. Apparatus as recited in claim 11, wherein:
the first carrier is initially positioned beneath the work position in vertical alignment with an article at the work position;

the second carrier is initially positioned above the work position in vertical alignment with the first; and the means for moving the first carrier toward the second moves the first carrier upward to lift the article from the work position to a position where it engages the second carrier.

16. Apparatus as recited in claim 15, wherein the means for feeding the articles to the work position comprises:

a horizontal vibratory feed track designed to feed the articles along the track in a single row one after the other; and a stop located along the track so as to stop the leading article in the work position;

the track having an opening in its bottom adjacent to the stop to permit passage of the first carrier through the track.

17. Apparatus as recited in claim 16, wherein means are provided along the track for holding down the article folliwing the one at the work position from a time prior to initial engagement of the first carrier with the leading article until after the first carrier has been retracted below the level of the track.

18. Apparatus as recited in claim 16, wherein:

at least two of the receiving locations comprise horizontal receiving tracks at substantilly the same elevation as the second carrier; and the means for moving the second carrier to the receiving locations operates to move the second carrier in a selected horizontal pattern such that the second carrier moves each article horizontally into an entrance end of the selected tack prior to release of the article, which motion pushes preceding articles along the receiving track.

References Cited

UNITED STATES PATENTS

| | | | |
|---|---|---|---|
| 3,039,604 | 6/1962 | Bickel et al. | 209—75 |
| 3,104,760 | 9/1963 | Monahan | 209—74 |
| 3,115,234 | 12/1963 | Eleftherion et al. | 198—33 |
| 3,123,199 | 3/1964 | Easterday et al. | 198—33 |
| 3,144,168 | 8/1964 | Campbell et al. | 221—11 |
| 3,147,867 | 9/1964 | Monahan | 214—1 |
| 3,151,349 | 10/1964 | Campbell et al. | 18—20 |
| 3,163,927 | 1/1965 | Brosseit | 29—203 |

JOHN F. CAMPBELL, *Primary Examiner.*

THOMAS H. EAGER, *Assistant Examiner.*